FIG. 1

INVENTOR.
Frank David Butler

Dec. 7, 1965
F. D. BUTLER
3,221,575
FLUID PRESSURE VARIABLE RATIO REVERSIBLE, COMBINED
HYDRODYNAMICAL AND MULTIPLY COMPOUNDED PLANETARY
GEARING DRIVEN TRANSMISSION COUPLER, ADAPTABLE
AS FORMING A COMBINED FLUID TORQUE CONVERTOR
TRANSMISSION COUPLER AND REAR
TRACTION-WHEEL-HOUSING
ASSEMBLY, OF AND FOR
AN AUTOMOTIVE VEHICLE

Filed Nov. 12, 1964

INVENTOR.
Frank David Butler

United States Patent Office 3,221,575
Patented Dec. 7, 1965

3,221,575
FLUID PRESSURE VARIABLE RATIO REVERSIBLE, COMBINED HYDRODYNAMICAL AND MULTIPLY COMPOUNDED PLANETARY GEARING DRIVEN TRANSMISSION COUPLER, ADAPTABLE AS FORMING A COMBINED FLUID TORQUE CONVERTOR TRANSMISSION COUPLER AND REAR TRACTION-WHEEL-HOUSING ASSEMBLY, OF AND FOR AN AUTOMOTIVE VEHICLE
Frank David Butler, 1409 Wardman St., Brea, Calif. 92621
Filed Nov. 12, 1964, Ser. No. 411,189
10 Claims. (Cl. 74—730)

While my invention relates in general to combined hydrodynamical and multiple compounded planetary gearing driven, internal fluid pressure variable and reversible, automatically operative torque convertor types of transmission couplers, it applies more specifically to improvements in such types of couplers wherein each of an opposite pair of same is adaptable in forming the hub proper of one each of an axially opposite pair of traction wheels of an ultra modern automotive vehicle. This, my present invention, relates primarily to improvements in my similar, previously patented, couplers, U.S. Patent No. 2,799,182, issued July 16, 1957, copies of which are obtainable from U.S. Patent Office.

The major improvements in my present coupler provides the following: A series of elongated cylindrical, combined fluid impulse and reaction, fluid circulating tubes, suitably disposed symmetrically spaced, extending parallel to the axis of rotation of and within the periphery of the coupler housing for increasing the forward motion rotation starting torque pull of the coupler. Means providing each in-tandem paired compounded planet-gear with a series of elongated cylindrical, diagonally axially extending, fluid circulating access holes symmetrically spaced within its respective hub relatively to its rotative axis, for increasing fluid flow starting torque pull of the coupler, and wherein such torque pull fluid flow within the coupler is substanitally nil while coupler is operating under any forward rotation 1 to 1 synchronized operating ratio, so therefore such coupler is truly an automatically operative torque convertor type in manner of operations. Means providing a simpler and better rotative bearing support for the coupler's rotative, driving shaft, planet-gear-carrier, the numerous in-tandem planet-gears, and the coupler's hub-shaped housing. Means providing a flanged annular shaped hub stator member and said driving shaft of the coupler, each with a series of dual type, spring steel, fluid-seal snap rings within each of a series of suitable ring-grooves thereof, wherein latter each ring should extend about ⅛″ deep and be ½₂″ thick, wherein all such snap-rings should be of relatively small outside diameter and all located within the outer limits of said hub stator member and hub-shaped housing of the coupler, as illustrated in the drawings, so that transmission fluid pressure supply hose may be temporarily plugged closed to retain all fluid within the coupler while it is being attached and/or detached from axle-shaft-housing-flange. Means providing the coupler assembly adaptable to form a 14″ detachable rim hub suitable to receive a 8.5″ puncture-proof tubeless-tire, with pneumatic air supply thereto and therefrom, through such demountable rim securing means. Other minor improvements that will appear as the specification progresses.

With reference to the figures of the drawings: FIG. 6 is an enlarged detail of the lower portion of the coupler, as in FIG. 1, except with the coupler rotated slightly and as would appear on the dotted line 6—6 of FIG. 7. The latter figure is a broken away transverse section and elevation as on the dotted and broken line 7—7 of FIG. 6. FIG. 8 is jointly an end elevation and series of transverse broken away sections of the coupler with the left half as taken on the multiple of dotted and broken lines 8—8 of FIG. 1, with the upper 30° of the right half as taken looking axially outward from the inward end of the planet-gear-carrier with the bonded reverse clutch disc removed to illustrate the bonding access holes in such carrier with the succeeding 22.5°, as taken through the fluid discharge impeller, at its axial center-line with the next succeeding 37.5°, as taken jointly adjacent inward end of suction impeller and inward upper end of lower in-tandem planet-gear PG4 and with the lower right 90°, as taken jointly at the inward end of the adjacent planet-gear PG7 and orbit-gear OG8 and through planet-gear journal PGJ, adjacent inward end of adjacent planet-gear PG5 and with the greater portion of such right half illustrating the inward side of the demountable rim DR in the background. FIG. 9 is jointly an enlarged broken-away detail of one of the in-tandem planet-gears PG6 and PG7, which are interchangeable with similar gears PG2 and PG3, on their respective journal pins PGJ, as illustrated in upper and lower halves in coupler FIG. 1, such in-tandem gears PG6 and PG7 are jointly illustrated diagrammatically in broken-away sections with their journal PGJ pulled inward to left to illustrate section of same. Wherein the large and small fluid circulating accesses are both drilled, diagonally axially through the gears, from their axially opposite pitch-circle-centerlines, with the smaller diameter accesses provided breaking-through in the center of the total width of such gears and forming fluid lubricating accesses LA, at such locations. FIG. 10 is an enlarged detail of a portion of FIG. 1 and illustrates detail of oval snap-ring of stator spline, detail and location of dual seal snap-rings large and small, all within the limits of the flanged stator support, and the detail and location of the medium and large diameter roller bearings. While

With reference to the drawings, similar letter and numeral symbols represent and indicate similar parts in the several figures and sketches as follows: Wherein the symbol DS, FIG. 1, indicates the elongated transmission driveshaft which latter is rotatively journalled upon the small and medium diameter tapering roller bearings RBS and RBM, respectively, with the axially outward end of such shaft DS rotatively supported in the cone of bearing RBS with latter having its outer race pressed and shouldered within the axially outward integral end of the combined traction-casing hub TCH and coupler-wheel-housing CWH and with the opposite axially inward end, of such shaft DS spline coupled to within the axially outward internally splined end of left axle shaft AS of the automotive vehicle. Which axle-shaft AS is rotative within the flanged elongated tubular left axle-shaft-housing ASH of such vehicle and wherein the axially inward end of such shaft AS may be splined into a hub of a hypoid bevelled master gear (not illustrated but rotatively mounted within intermediate length of such housing ASH and) rotatively driven by a motive power means of such vehicle not required to be provided with the usual differential gearing means. The inner cone of bearing RBM is a pressed shouldered fit over and near the spline at axially inward end of shaft DS while the outer diameter of outer race of bearing RBM is jointly a press fit within adjacent annular recesses within adjacent flanged ends at axially outward end of housing ASH and inward end of the flanged elongated annular shaped stator support FSS, which flanged ends are normally flange-bolted together by five stud-bolts SB, FIG. 8, and by which means the adjacent flanges of housing ASH and stator support FSS and also shafts DS and AS are all retained coaxially concentrically in line with each other. The stator support FSS is provided with a plurality of in-tandem internal bores extending therethroughout which are a relatively close fit over matching in-tandem external surfaces of said shaft DS. While such support FSS is provided externally adjacent its axially outward end with a stator spline SS over which an internally splined stator disc SD is a press-fit, and is provided axially seated inward against and closing an oval shaped snap-ring OSR within an annular shaped suitable ring-groove in said shaft DS, and wherein disc SD is retained shouldered against ring OSR by socket headed set-screws SSS, FIG. 10. Support FSS is further provided externally with in-tandem cylindrical surfaces over the smaller diameter of which an inner cone of the relatively large diameter roller bearing RBL is a pressed shouldered fit, while a flanged annular shaped cover LBC of bearing RBL is a close-fit over the larger diameter in-tandem cylindrical surface of support FSS.

Figure 1:
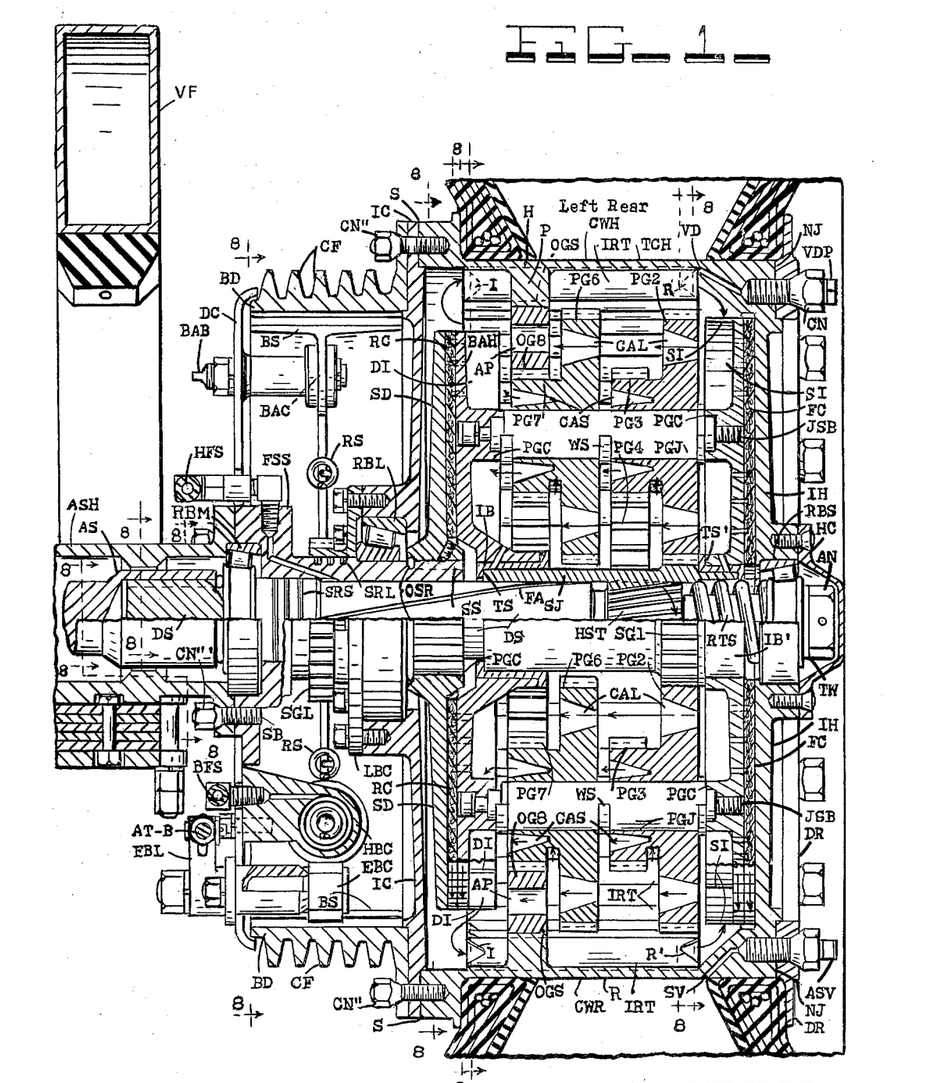
FIG. 1 is a longitudinal section through the left rear coupler of an axially opposite pair of couplers, of my present invention improved couplers, as may be provided each with radially opposed sets of two and single pair of in-tandem paired quadruple compounded planetary gearing and as such left coupler would appear on the doted and broken lines 1—1 of FIGS. 2, 3, 4, 5 and 8.
Figures 2, 3:
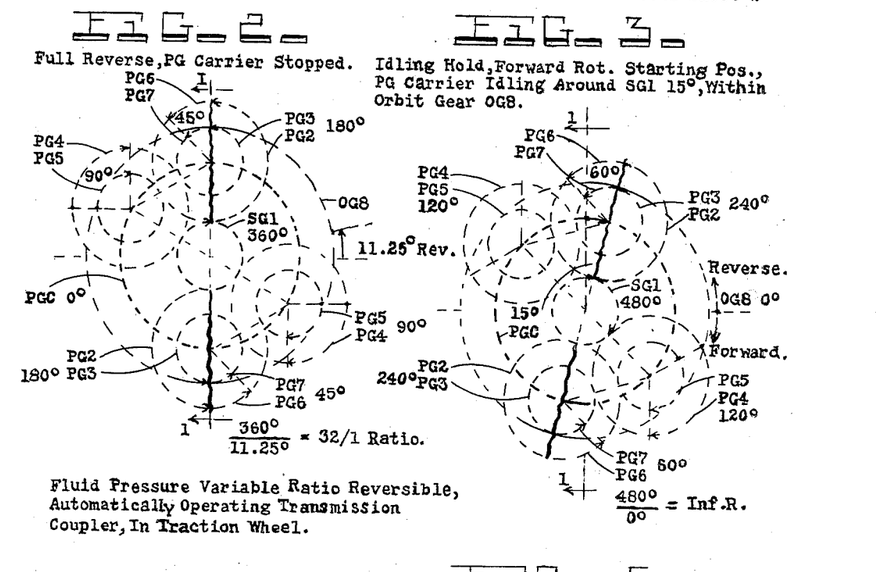
FIGS. 2 to 5 inclusive are diagrammatic sketches which indicate the relative rotation of the coupler's sun-gear, planet-gear-carrier sets of in-tandem paired quadruple compounded planet gears and the orbit-gear under various conditions of coupler operations.
Figures 4, 5:
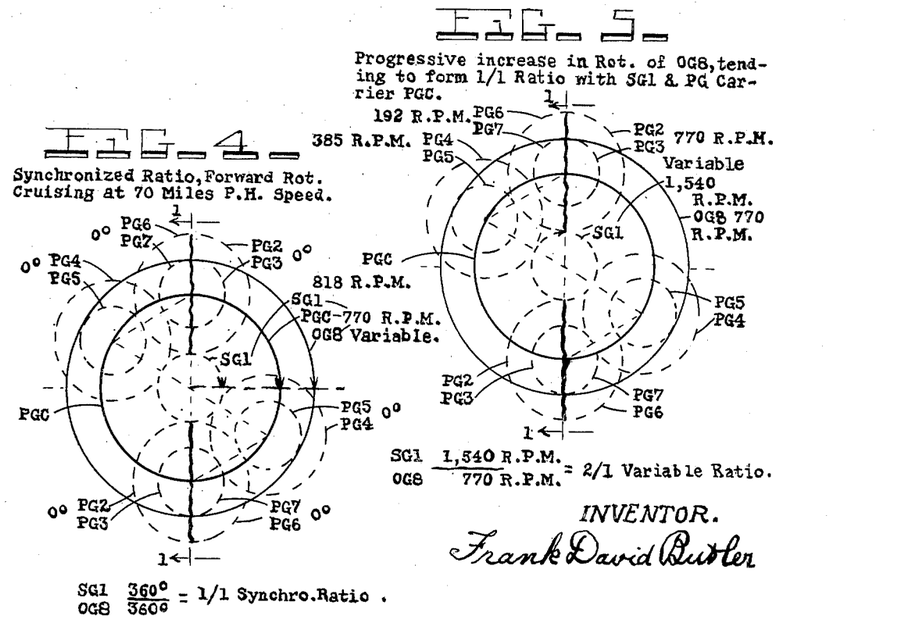
Figure 5:
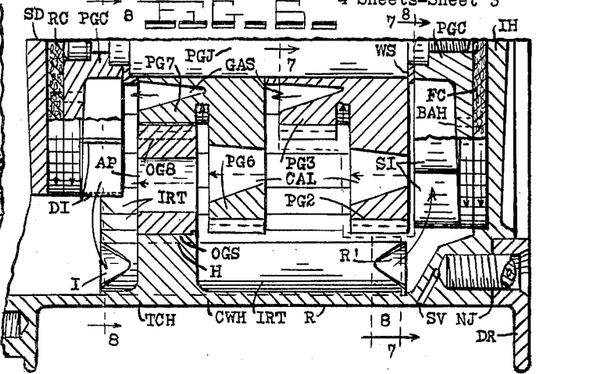
Figure 7:
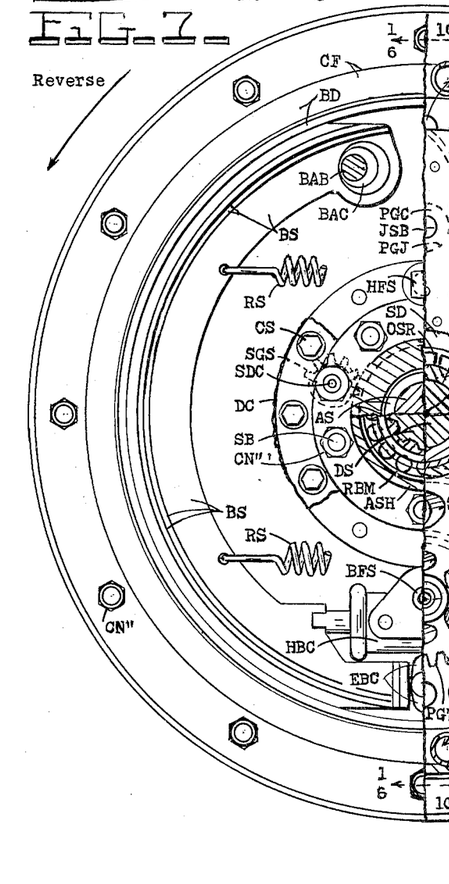

Keeping in mind that the complete coupler wheel assembly, as illustrated in FIG. 1, is the one forming the left rear wheel hub of the vehicle in order that such respective coupler assembly may be either conveniently un-coupled from, and/or coupled to the flange of the adjacent left axle-shaft-housing ASH, without having to drain out the normally S.A.E. grade 10A transmission lubricating fluid, through the respective socket headed combined vent drain plug VDP, the following provisions are made within the respective coupler: Its respective drive-shaft DS is provided with a series of annular shaped suitably spaced ring-grooves located towards the coupler from the cone of the roller bearing RBM, pressed and shouldered over such shaft with each such annular groove provided with a dual pair of relatively small diameter snap-type of fluid seal-rings SRS therein and bearing radially outward and non-rotative within said larger diameter internal bore of said stator support housing FSS. While latter, in turn, is provided with a similar series of similar shaped and similarly spaced ring-grooves located in said larger diameter in-tandem cylindrical surface externally thereto such support FSS with each such annular groove provided with a similar dual pair, but of slightly larger diameter, of snap-type of fluid seal-rings SRL therein and bearing radially outward within and rotative with said flanged annular shaped cover LBC of said bearing RBL. With such stator support FSS provided further with tubing fitting accesses such as HFS, through which to supply hydraulic fluid from its source of supply (which latter may be a manually operative common master hydraulic cylinder assembly unit, not illustrated, but foot operative manually by the driver of the vehicle) to adjacent such shaft DS inside the coupler from such seal-rings SRS and SRL, for normal purpose of reversing such coupler and backing the vehicle wherein any convenient one of such access fittings HFS may be temporarily either plugged and/or capped off during such coupling procedure operation. With further reference to FIG. 1, the respective drive-shaft DS of the respective left and/or right coupler wheel hub assembly, is further provided with: A resilient reverse thrust coil-spring RTS, suitably expandably mounted over a reduced diameter outward end thereof such shaft DS, and with such coil-spring rotatable therewith latter and also with the inner cone of said roller bearing RBS and with the integral, internally helically splined combined sleeve-journal SJ and sun-gear SG1, and therewith tending during the normal idling rotation of such shaft DS, to retain the planet-gear-carrier PGC, shouldered journalled upon sleeve SJ, axially inward, with its bonded reverse clutch disc RC, bearing slightly axially against stator disc SD. While the helical spline thrust HST, integral with shaft DS, is simultaneously tending slightly to resist such inward thrust of spring RTS during such normal idling speed of such drive-shaft DS. So therefore, it is apparent that during such normal idling speed of such drive-shaft DS and sun-gear SG1, which we will assume to be approximately 112 r.p.m., the vehicle operator has the opportunity and choice to do any one of several different things such as: To gently fluid pressure variable ratio reverse both axially opposite transmission-coupler-traction-wheel-hub assemblies CWH simultaneously from their idling hold position of their respective sun-gear SG1, in tandem planet-gears PG2 to PG7, planet-gear-carrier PGC forward idling rotation operation, as in FIG. 3. Wherein latter figure, the orbit-gear OG8, and traction wheel combined hub and coupler housing CWH, are being simultaneously held by brake-shoes BS, FIG. 1, and the carrier PGC is rotating forward at ⅛ the similar direction idling rotative speed of shaft DS and sun-gear SG1, and/or at 14 r.p.m., by the planet-gear PG7, 24 teeth 10 pitch, diametral-pitch-circle line, crawling along the orbit-gear OG8, 96 teeth 10 pitch, diametral-pitch-circle line and thereby carrying carrier PGC idling around sun-gear SG1 within orbit-gear OG8. To a relatively slower forward rotation idling of such carrier PGC within such orbit-gear OG8, simply by gently progressively applying fluid pressure to within such couplers in manner previously described and thereby slightly clutching the smaller diameter reversing clutch lining RC, bonded to inward end of planet-gear-carrier PGC, axially inward against stator disc SD and thereby gradually slowing down rotation of carrier PGC and thereby slowly reversing orbit-gear OG8. To abruptly fluid pressure reverse both axially opposite transmission-coupler-traction-wheel-hub-assemblies CWH simultaneously from their idling hold position, as previously mentioned illustrated in FIG. 3. Fluid pressure is abruptly applied to within both couplers by the manually operative means previously described, and thereby abruptly stopping the forward rotation of the respective planet-gear carrier PGC completely by severe clutching of its bonded reversing clutch lining RC, axially inward against said stator disc SD and thereby immediately resulting in reversing orbit-gear OG8, under a 32/1 ratio between sun-gear SG1 and such orbit-gear OG8, as illustrated in FIG. 2. To gently start both axially opposite transmission-coupler-traction-wheel-hub-assemblies CWH simultaneously rotating in their forward motion rotation progressively from their gearing idling hold position, as in said FIG. 3. The usual motive power foot accelerating means of such vehicle, is gently progressively depressed to gradually increase the rotative speed of said drive-shaft DS and sun-gear SG1 simultaneously with the planet-gear-carrier PGC accelerating in its rotation, ⅛ as fast as the acceleration as such shaft and sun-gear until the orbit-gear OG8 starts rotating forward and increases in speed progressively as the accelerator is gradually depressed further downward, until the rotation of the gearing and planet-gear-carrier PGC may automatically become similar to speed of rotation to that of the rotative elements of the coupler, as illustrated in FIG. 5. Then if the accelerator is suddenly momentarily released, and then depressed clear down, the speed of rotation of the sun-gear SG1 and the planet-gear-carrier PGC will then drop down, similar to the rotative speeds thereof illustrated in FIG. 4, and then as such accelerator is depressed clear down produces an accelerated axially outward thrust drive by the external helical spline thrust HST, of drive-shaft DS, against the internal helically matching splines of the integral combined sleeve-jounral SJ and the sun-gear SG1.

Which accelerated axially outward thrust of such sleeve SJ upon which said planet-gear-carrier PGC is shouldered journalled results in such carrier PGC being clutched at its larger diameter, bonded forward motion clutch lining FC axially outward against the axially inward side of the axially outward integral head IH end of the combined traction-casing-hub TCH and coupler-wheel-housing CWH, which results in said sun-gear SG1, planet-gear-carrier PGC, and orbit gear OG8 all rotating in a synchronized 1 to 1 coupler operations ratio, as in FIG. 4. To abruptly start both axially opposite traction coupler-wheel-hub-assemblies CWH simultaneously rotating in their forward motion rotation quickly from their gearing idling hold position, as in FIG. 3, the usual foot accelerator means of such vehicle is depressed semi-abruptly to accelerate the rotative speed of the sun-gear SG1, the drive-shaft DS, and the planet-gear-carrier PGC, without causing latter to be clutched axially outward tightly at its clutch lining FC but sufficiently to accelerate the rotation of the orbit-gear OG8 and forward travel of the vehicle. Then as vehicle approaches an appreciable speed of about 15 m.p.h., the accelerator is momentarily released and then abruptly depressed clear down, the 1st action allows the gearing and carrier in the couplers to synchronize in a 1 to 1 ratio, as in FIG. 4, with nil rotation of the in-tandem planet-gears PG2 to PG7 and with nill fluid circulation within the coupler, but with considerable hydrodynamical fluid pressure existing within the inner periphery of the coupler wheel housing CWH and in an efficient condition of cruising coupler operations. Wherein the 2nd action tightly clutches the forward clutch lining FC of the planet-gear-carrier PGC against the inner side of the axially outward integral head IH end of such housing CWH and tends to retain them synchronized in their rotative speeds, as in FIG. 4.

Figure 8:
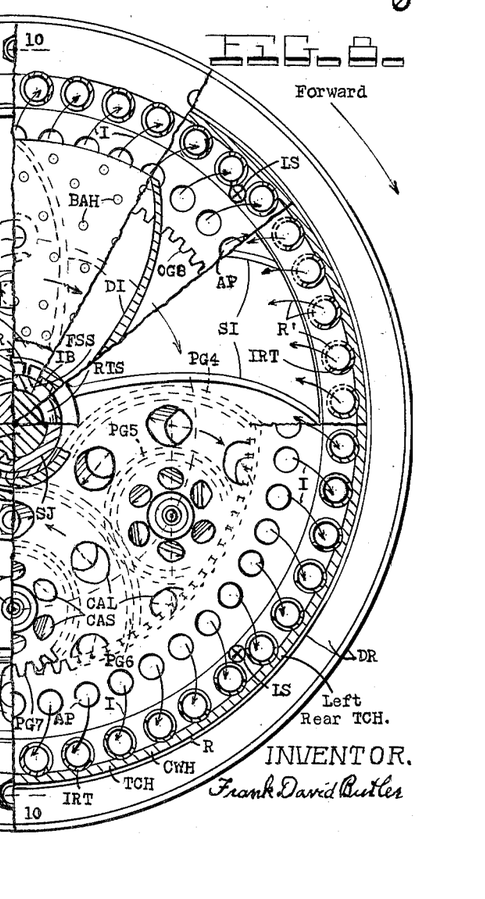
Figures 9, 10:
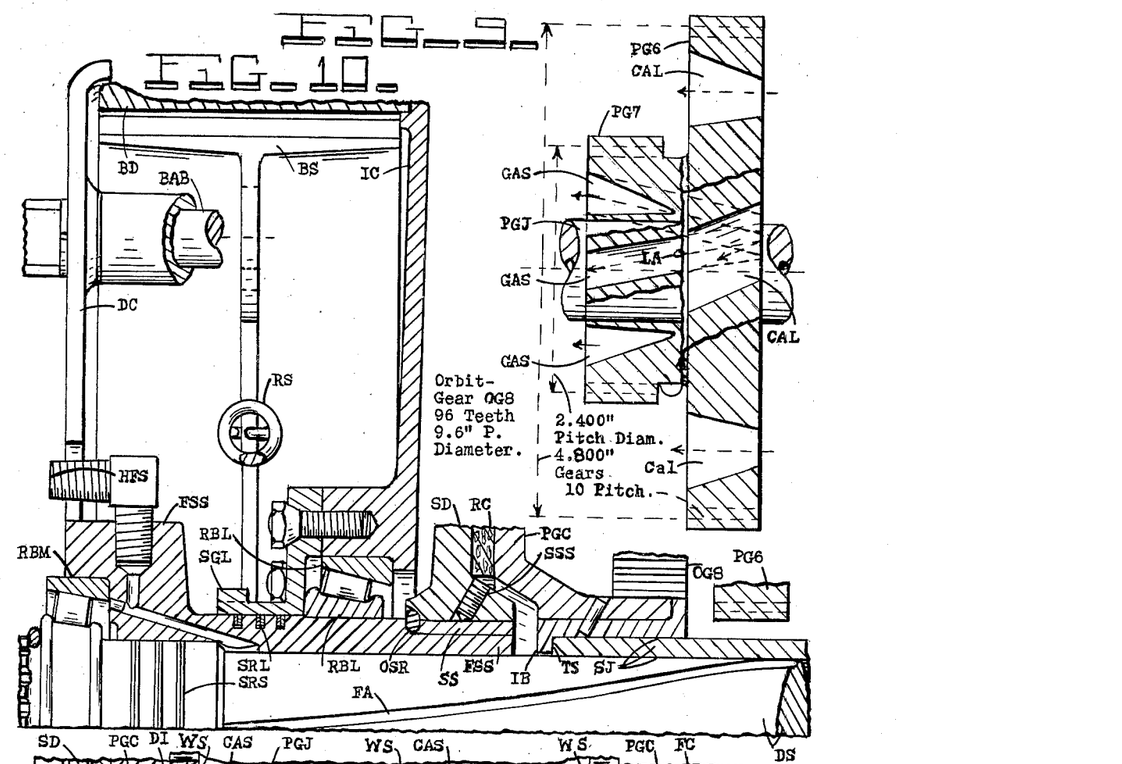
Figure 11:
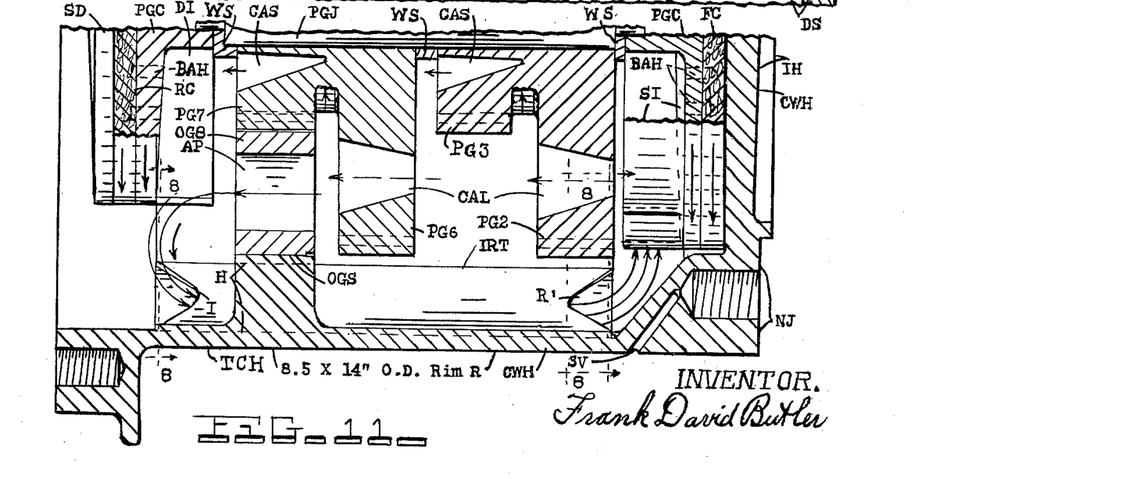
FIG. 11 is an enlarged detail of one of the combined fluid circulating impulse and reaction circulating tubes, as illustrated near bottom of FIG. 1.

Inasmuch as the majority of new automotive vehicles are equipped with tubeless tire traction casings of sizes normally ranging between 7″ to 8.5″, applicable normally to 14″ tire rims R of drop-center types, which latter portion is objectionable in my type of coupler wheel housing, as illustrated in FIGS. 1 and 8, so it is important that data on the most efficient type of gearing means, fluid circulating means, mechanical means etc., to be used in conjunction with my type coupler-wheel-housing CWH, as applicable to an ultra modern automotive vehicle, be completely described in detail herein so that any layman skilled in the arts may thoroughly understand same. Briefly the gearing data is as follows: Spur-gearing of 10 diametral pitch is used. The sun-gear SG1 and all the small diameter planet-gears PG3, PG5 and PG7 each have 24 teeth, 2.400″ pitch-circle-diameter, and 2.600″ O.D. The planet-gears PG2, PG4 and PG6 each have 48 teeth, 4.800″ P.C.D., and 5.000″ O.D. The orbit-gear OG8 has 96 teeth, 9.600″ P.C.D., and 9.400″ inside diameter. The in-tandem plant-gears PG2–PG3 and PG6–PG7 of this the left coupler-wheel-housing CWH are interchangeable with one another and with the in-tandem planet-gears PG4–PG5 of the right interchangeable coupler-wheel-housing CWH (not illustrated), but vice versa applicable. The in-tandem planet-gears could all be of relatively high tensil strength cast aluminum alloy metal and/or similar to the orbit-gears of case-hardened steel. The orbit-gears OG8 are interchangeable L. and R. couplers. The integral combined sleeve-journal SJ and sun-gear SG1, also the drive-shaft DS, and planet-gear-carrier PGC are all not interchangeable between L. and R. couplers. The in-tandem compounded paired planet-gears PG2–PG3 and PG6–PG7 of this left coupler-wheel-housing CWH and identical gears PG4–PG5 of right coupler-wheel are all drilled diagonally axially between their axially opposite pitch circle centerlines, in the direction illustrated diagrammatically in broken away sections in FIG. 9. With their larger diameter fluid circulating accesses CAL extending at a greater angle through the larger diameter gears only and the smaller diameter fluid circulating accesses GAS extending at less angle, entirely throughout both in-tandem gears between their axially opposite pitch circle centerlines, with each small access CAS breaking-through at its mid-length, as at lubricating access LA, terminating adjacent and lubricating their journal pin PGJ, and wherein the unnamed remaining in-tandem paired planet-gears in the right and left coupler assemblies are similarly drilled for fluid access circulation, but in vice versa angle directions to those illustrated in said FIG. 9.

With reference to FIGS. 1, 6, 7, 8 and 11 in order to provide each axially opposite coupler assembly with means that will considerably increase the efficiency of the fluid circulation therein, especially during the forward motion rotation starting thereof, each such coupler assembly is provided with: a series of elongated, cylindrical combined fluid impulse and reaction circulating tubes IRT symmetrically evenly spaced, extending axially parallel to the axis of rotation of the respective drive-shaft DS of such coupler and provided bearing radially outward against the curved inner cylindrical periphery of the respective coupler-wheel-housing CWH and each rigidly retained in place by being pressed axially through one each of a similar series and spaced of reamed holes H. Which latter are provided extending extremely close to the inner periphery of coupler-housing CWH axially through the annular partition P which is integral with such housing CWH and is provided forming a shouldered seat OGS for orbit-gear OG8. Wherein the enlarged detail FIG. 11, for the sake of a simple illustration and description, only one single impulse reaction fluid circulating tube IRT is illustrated jointly in side elevation diagrammatical form as completely installed in the partition P and the inner periphery of the left coupler-wheel-housing CWH, and wherein the transmission coupler fluid being diagrammatically circulated therethrough such tube IRT from the fluid discharge impeller DI to the induction and/or suction impeller SI. Which impellers are both rotated with the planet-gear-carrier PGC and therefore are producing a continuous fluid flow impulse I, at the impeller DI end thereof and a similar but continuous reaction fluid flow R′ at the opposite end of such tube IRT, adjacent the suction impeller SI end thereof. Which continuous impulse reaction flow of such fluid through such tube IRT results in a continuous thrust applicable at both opposite ends of such tube IRT, which tend to impel the coupler-housing CWH along with the orbit-gear OG8 in their forward direction of rotation. Such type of continuous flow of the transmission fluid into one axial end of such circulating tubes IRT and out of the axially opposite end thereof, is so illustrated diagrammatically in right half of FIG. 8, wherein 50% of such tubes IRT are illustrated in diagrammatically impelling such coupler wheel housing CWH in its forward rotation. Normally the fluid circulating tubes IRT, as used in conjunction with an 8.5″ traction tire TC and 14″ O.D. tire rim R, as in FIGS. 1 and 11, should each be ⅝″ O.D. x 3¾″ long with both axially opposite ends beveled to a 30° angle from its longitudinally extending centerline, to a depth of ½ its diameter and should appear as in FIG. 11, after being slightly rotated to form a more efficient impulse reaction fluid flow therethroughout, and then pressed through one of the holes H in the partition P to its final operating position. With reference to the coupler rotation diagrammatical operating sketches FIGS. 2 to 5 inclusive, it is apparent that when the planet-gear-carrier PGC is stopped, as in FIG. 2 backing, and/or when such carrier is rotating at a 1 to 1 ratio with orbit-gear OG8, as in FIG. 4, there would be nill fluid circulation within the coupler. This would also apply if such gear OG8 were rotating faster than such carrier PGC. However whenever the carrier PGC is rotating faster than the orbit-gear OG8, the former tends to rotate the latter at a 1 to 1 synchronized ratio therewith by such fluid flow through tubes IRT, while the clutching of the carrier PGC at its bonded clutch disc FC, against the inner end of the integral head IH, axially outward end of coupler housing CWH, is simultaneously tending to synchronize carrier PGC and orbit-gear OG8 in a 1 to 1 ratio with the rotation of drive shaft DS and the sun-gear SG1, which is the coupler's most efficient operating ratio.

With reference to further miscellaneous symbols and unique improvements of and within the invention coupler-assembly: The drive-shaft DS and the coupler wheel housing CWH may be simultaneously adjusted on the tapering roller bearings, respectively, RBM–RBS and RBS–RBL by tightening the adjustment nut AN against the inner cone of bearing RBS via the usual tongued locking washer TW there-between. Which adjustment simultaneously results in pulling shaft DS axially outward and displacing housing CWH axially inward along with outer race of bearing RBL, and wherein though the stator support FSS is not simultaneously displaced, however any axial wear on the bonded, reverse and forward clutch linings respectively, RC and FC rotative with carrier PGC, in as far as excess axial clearance of latter is concerned, would be simultaneously reduced by such adjustment of said nut AN and would also result in greater axial clearance between stator disc SD and the coupler's removeable inspection cover IC so latter may be provided with soft metal adjustment shims S. However, such reverse and forward clutch linings RC and FC, respectively, should each be $3/16''$ thick when new, and the orbit-gear OG8 should be provided with sufficient axial clearance so that such bonded linings could both wear substantially out without affecting the coupler gearing operation. The special stud-bolt ASV is provided at its conical end with a gasket seat and also is in communication at such end, via the combined supply vent access SV with the rim R, within the shoe TS of traction tire casing TC. The special stud-bolt, radially oppositely to bolt ASV, is provided with a combined fluid vent and drain plug VDP, at its axially outward end and with a conical gasket-seat at its inward conical end where-at it is in communication via a combined vent drain access VD, with the inner periphery of housing CWH intermediately to fluid outlet ends of two adjacent fluid circulating tubes IRT. In order that the planet-gear-carrier PGC, and its internally helically matching splined combined sleeve-journal SJ and sun-gear SG1 may both be made conveniently axially slidable by reverse thrust coil-spring RST, in axially inward direction, and by helical spline thrust HST integral with drive-shaft DS in axially outward direction, the carrier PGC is provided with a pair of annular Z shaped insert bearings IB and IB' with one each pressed into one each of a pair of axially opposite bores thereof, supporting such carrier upon such sleeve-journal SJ and therewith forming suitable respective thrust shoulders TS and TS' with one adjacent each axially opposite end of such journal SJ. In order to provide sufficient hydraulic fluid supply HFS communication access from adjacent the coupler side of the series of small seal-rings SRS further into the coupler proper, the drive-shaft DS is provided with a plurality of helically extending fluid access grooves FA, which latter convey such hydraulic fluid HFS to adjacent the helical spline thrust HST, and simultaneously radially outward between stator disc SD and carrier PGC, while simultaneously lubricating such shaft DS within stator support FSS, see FIGS. 1 and 10. The demountable rim DR is secured tightly over its flanged nylon joint NJ with the integral axially outward head IH of the coupler-wheel-housing CWH, by the series of conical nuts CN. The flanged, preferably air cooled cast aluminum alloy metal brake-drum BD, adjacent flanged inspection cover IC, and the adjacent end of the flanged combined coupler-wheel-housing CWH are all rabbet-joint secured coaxially together by the series of conical nuts CN''. The flanged combined stator and coupler-wheel-housing support FSS and the adjacent flanged axle-shaft-housing ASH are flange bolted coaxially together over the outer-race of the bearing RBM by the series of conical nuts CN'''. While the radially halved dust-covers DC of brake-drum BD are each half flanged shouldered over and secured to said support FSS by the series of integral washered cap-screws CS. As the usual speedometer of such vehicle must indicate and record the differential speed of travel and distance travelled of the two axially opposite coupler-traction-wheel-housing assemblies CWH. The left rear housing CWH, illustrated in FIGS. 1 and 10, discloses an integral spur-gear-large SGL, of cover LBC, provided rotatable with inspection cover IC of such housing CWH. While the diagrammatical pitch-circles of the driven spur-gear-small SGS and spur-gear-large SGL are illustrated in mesh in FIG. 8, with the gear SGS provided rotatively journalled extending axially throughout the flanges of the adjacent support FSS and housing ASH and provided rotatively driving one of an axially opposite pair of driving cables SDC which both may lead to axially opposite ends of an intermediately located differential gearing means, not illustrated, but through which to drive such speedometer of such vehicle.

While the motive power means driving a pinion-gear, meshing with said hypoid-master-gear, should have an idling speed of around 500 r.p.m., the idling speed such master-gear should be around 112 r.p.m., and needs no differential gearing means. Such motive power means may be flexibly mounted within either the automotive vehicle's rear and/or front framing means VF. In either case, each coupler wheel housing CWH, should be provided with a combined foot and emergency braking means, in conjunction therewith, but which latter need not be further described herein.

The complete improvement in fluid pressure variable ratio reversible, combined hydrodynamical and multiply compounded planetary gearing driven torque convertor transmission coupler and rear traction wheel housing assembly combination invention as defined herein may be manufactured and used by or for the Government of the United States of America for governmental purposes without the payment to me of any royalty thereon or therefor. Such complete invention may also be manufactured and used or sold by any U.S.A. manufacturer of same by the payment thereon and therefor each such assembly so manufactured of a royalty of twelve dollars payable to and as directed by, the Social Security Administrative Branch, of the U.S. Department of Health, Education and Welfare, Washington, D.C. 20231. With $3.00 of each such royalty to be deposited thereat, to my account there. Thus having fully described my invention assembly in its best form of adaption within a modern automotive vehicle.

With reference to miscellaneous details illustrated in FIGS. 1 and 8: The clutch linings RC and FC should normally be anchor bonded to the respective impellers DI and SI of the carrier PGC by and through numerous bonding-access-holes BAH extending axially through such respective impellers. The axially outward limits of traction tire TC should be beyond outward end of hub-cap HC for protection of latter. A plurality of socket-headed elongated stud-bolts JSB annular shaped washer-spacers WS and shouldered cylindrical planet-gear-journal pins PGJ are provided retaining the assembled planet-gear-carrier PGC coaxially together in rotatable operating condition. Such carrier's fluid-circulating-discharge-impeller DI is provided convex-vaned CV on its discharge side and is smaller in outside diameter than such carrier's fluid-circulating-suction-impeller SI which latter is concave-vaned CC on its suction side. During the rotation of such carrier PGC and including the rotation of the numerous planet-gears therewithin the fluid-flow-circulation within the coupler-wheel-housing CWH as illustrated diagrammatically is: Radially inward through suction impeller SI thence axially inwards through the numerous series of relatively large and small diameters of diagonally axially extending, existing and provided, fluid induction circulating accesses CaI and CaS respectively, within such numerous in-tandem-planet-gears. Thence jointly axially to within radially inward end of said fluid discharge impeller DI and axially inward through the series of symmetrically spaced fluid circulating access-passages AP extending axially through the orbit-gear OG8 midway between its gear-teeth and its shouldered seat OGS within annular portion P integral with such housing CWH. Thence discharged jointly from said accesses AP by such convex-vaned discharge impeller DI jointly radially outward and circumferentially in the direction of carrier PGC rotation into adjacent axially inward, fluid impulse-flow-ends I of the series of symmetrically spaced axially extending combined impulse-reaction fluid-flow-circulating tubes IRT. Thence axially outward through such tubes IRT, adjacent the inner periphery of such coupler-wheel-housing CWH and thence from axially outward fluid-flow-reaction-ends R' of each such tube jointly radially inward and circumferentially in opposite direction to carrier PGC rotation into the radially outward fluid scoop induction ends of said concave-scoop suction impeller SI and thereby ending such fluid-flow cycle. Wherein such a hydrodynamical, impulse-reaction, circumferential fluid-circulating-flow through such tubes IRT plus the centrifugal force generated by the forward rotation of such carrier PGC including the numerous plant-gears carried there-with plus the helical angle axially outward thrust of spline HST acting jointly with the means affective hydrodynamical fluid pressure, tending to clutch carrier PGC axially outward against the integral head IH end of such housing CWH, all unite in accelerating latter in its forward rotation and tend to synchronize such housing CWH automatically with similar rotation of such carrier PGC, sun-gear SG1 and drive-shaft DS. Which synchronized forward rotation of such rotative elements results in stopping the fluid-circulating-cycle and the planet-gears' rotation, and simultaneously causes coupler-wheel-housing CWH, including its orbit-gear OG8, to become a hydrodynamical rotating mass as in FIG. 4.

Inasmuch as the final rotative drive of the coupler-wheel-housing CWH must be transmitted from the orbit-gear OG8 through its peripheral shouldered seat OGS to such housing CWH through such portion P integral with latter and forming such seat OGS, such gear OG8 should therefore be provided a slight-tapering extremely tight chilled-fit axially outward within such seat OGS against the shoulder of latter and should be retained tightly against such shoulder by symmetrically spaced lock-screws similar to LS, as in FIG. 8.

While the motive power means driving a pinion-gear meshing with said hypoid-master-gear should have an idling speed of around 500 r.p.m., the idling speed such master-gear should be around 112 r.p.m. and needs no differential gearing means. Such motive power means may be flexibly mounted within either the automotive vehicle's rear and/or front framing means VF. In either case, each coupler wheel housing CWH should be provided with a combined foot and emergency braking means in conjunction therewith, but which latter need not be further described herein. The complete improvement in fluid pressure variable ratio reversible combined hydrodynamical and multiply compounded planetary gearing driven torque convertor transmission coupler and rear traction wheel housing assembly combination invention as defined herein may be manufactured and used by or for the Government of the United States of America for governmental purposes without the payment to me of any royalty thereon or therefor.

Thus having fully described my invention assembly in its best form of adaption within a modern automotive vehicle.

I claim:

1. In a liquid fluid, pressure-variable-ratio-reversible, rotatable combined hydrodynamical-torque-convertor and in-tandem multiply-compounded planetary-gearing-driven, automatically-operative, combined fluid-transmission-coupler-housing and traction-wheel-hub assembly, the provision therein and therewith, comprising; a series of elongated-cylindrical combined impulse-reaction fluid-flow-circulating tube means provided, symmetrically disposed, bearing radially outward against an inner periphery of such coupler-housing, concentrically with its rotation-axis, with one each such tubes provided pressed through and extending a predetermined distance axially outward beyond one each of a similar series of cylindrical hole means, each provided extending axially through an annular partition means extending radially inward from and integral with said coupler-housing and provided forming a shouldered-cylindrical-seat means for an annular shaped orbit-gear rotatable with axially inward end such housing; and wherein each such tube is provided adjacent its axially opposite ends with one each of an axially opposite pair of obliquely semi-circumferentially and axially extending respective fluid-flow-impulse and fluid-flow-reaction access means on the same side thereof circumferentially oppositely to the normal direction of such housing's forward rotation with each fluid-flow-impulse access located adjacent a radially outward periphery end of an axially inward multiple convex-vaned fluid-circulating-discharge-impeller means, rotatable with a planet-gear-carrier of such transmission-coupler in same normal direction as its housing, and providing discharging circulating fluid-radially outward semi-circumferentially under a hydrodynamical-pressure in same normal direction into the fluid-flow-impulse end means, and thence axially outward through each respective tube and thence jointly semi-circumferentially in opposite direction to such housing rotation, out through the axially outward fluid-flow-reaction end means, such respective tube, semi-radially inward into radially outward periphery end of a multiple concave-scoop-vaned fluid-circulating-induction-suction-impeller means, also rotatable with such carrier adjacent its axially outward end; wherein such impulse-reaction fluid-circulating-hydrodynamical-flow through each such tube means plus the centrifugal-rotation-velocity of such planetary-gearing-carrier, assists in automatically-synchronizing the rotation of such orbit-gear and fluid-coupler-housing with the normal forward rotation of such carrier, and a drive-shaft and sun-gear for rotatively driving the in-tandem planetary-gearing carried by such carrier; and wherein such synchronized rotation of such rotative elements results in simultaneously terminating the rotation of the in-tandem planetary-gears and the circulation of the fluid within such coupler-housing, and also in hydrodynamically clutching such carrier axially outward against an integral head end of such coupler-housing and thereby resulting in an efficient ideal condition of coupler cruising operations.

2. The provision therein and therewith, the pressure-variable-ratio-reversible, torque-converter automatically-operative, combined fluid transmission-coupler-housing and traction-wheel-hub assembly as defined in claim 1, of additional means for increasing an existing forced fluid-flow circulation of and through each such in-tandem planet gear thereof, comprising; providing each such in-tandem gear journalled directly upon a respective journal-pin means thereof; and providing a hub means of each such in-tandem rotatable planet-gear with a series of symmetrically spaced, diagonally axially extending, fluid circulating access means, which latter, during rotation of each such respective in-tandem planet-gear are each provided taking fluid suction from adjacent the fluid induction impeller axial side thereof and discharging such fluid towards the fluid discharge impeller axial side thereof in order to accelerate flow of such coupler fluid within such housing for improvement in normal forward rotation starting of latter and during acceleration thereof during relatively heavy torque pull conditions of operations.

3. The provision therein and therewith the liquid fluid, pressure-variable-ratio-reversible, rotatable combined fluid-transmission-coupler-housing assembly as defined in claim 1, additional means improving a rotatable journal-bearing means upon which said planet-gear-carrier is rotatively supported and axially shouldered comprising; means providing such axially inward, fluid discharge impeller end, and such axially outward, fluid induction impeller end of the rotatable planet-gear-carrier, each with a Z annular shaped shouldered cylindrical bearing means pressed thereinto a pair of axially opposite bores therein; means providing an elongated combined sun-gear, and internally helically splined, axially oppositely shouldered sleeve journal means, a radially relatively close rotative journal fit within such Z annular shaped bearings and also a relatively close rotative axial fit between radially inward projecting shoulders, at extreme axial ends, of an axially opposite pair of such Z bearings; and providing such sleeve journal jointly a relatively close cylindrical and helically splined axially slidable fit internaly thereto, over an elongated helically externally splined drive-shaft means, rotatively journalled concentrically to such coupler housing's rotative axis, and provided rotatively driving one such in-tandem planetary gears carried by such carrier through such sun-gear integral with such internally splined sleeve journal, and wherein the axially opposite shouldered ends of latter are for axially sliding such carrier either axially inward preceding reversing such coupler-housing, and/or axially outward preceding forward rotation clutching thereof.

4. In a liquid fluid, pressure-variable-ratio-reversible, rotatable combined hydrodynamical-torque converter and in-tandem multiply-compounded planetary-gearing-driven, automatically-operative, combined fluid-transmission-coupler-housing and traction-wheel-hub assembly, provided therein and therewith, comprising; a plurality of three different diameter, simultaneously axially adjustable tapering roller bearing means provided for jointly efficiently, rotatively supporting a rotatable drive-shaft of such coupler, and the rotatable coupler-wheel housing assembly itself; with such drive-shaft provided rotatively supported, adjustably axially upon a small and a medium diameter pair such roller bearings with smaller bearing provided slidably axially adjustable inward over an axially outward adjustable end means thereof such shaft and with medium diameter bearing cone provided axially inward shouldered, adjacent and over an axially inward end means such shaft and axially adjustable outward therewith; with an outer race, the last mentioned bearing provided jointly pressed axially within, and adjacent axially outward recessed end of an elongated tubular flanged axle-shaft-housing means of such vehicle and into an adjacent axially inward recessed flanged end of an elongated tubular flanged stator-support-means, provided supporting such drive-shaft therein, and said coupler-housing thereover, and provided coaxially concentrically flanged bolted to flanged end said flanged axle-shaft-housing; with such combined fluid-transmission-coupler-housing and traction-wheel-hub assembly means, provided rotatively supported, simultaneously adjustably axially upon the small diameter and a large diameter such roller bearings forming a pair of same, with an outer race, such small bearing, provided pressed and shouldered axially inward in an axially outward integral head end, such coupler-housing and simultaneously adjustably axially inward therewith latter during the adjustment said drive-shaft, and, with said large diameter bearing cone provided a pressed shouldered fit over the smaller diameter of a stepped in-tandem diameter's external cylindrical surfaces, of said flanged stator-support means adjacent to an axially inward flanged inspection cover means end of, and provided secured to and rotatable with such coupler-housing; and with an outer race, such large bearing provided jointly a pressed shouldered fit within an adjacent, axially inward, recessed end such inspection cover such coupler-housing and a pressed fit into an adjacent recessed end of an elongated annular flanged shaped cover means for such large bearing provided secured coaxially concentrically to such inspection cover, and rotatable and simultaneously adjustable axially inward with such coupler-housing over the inner cone of such large diameter bearing.

5. A liquid fluid, pressure-variable-ratio-reversible, rotatable fluid-transmission-coupler-housing assembly, as defined in claim 4, provided with additional means therein and therewith, comprising; means providing said tubular flanged stator-support with an elongated stepped in-tandem diameter, internal bore means extending concentrically thereto therein as a relatively close rotative fit over matching in-tandem adjacent external, cylindrical surfaces of said drive-shaft with the larger diameter surface means adjacent the coupler end of the medium diameter bearing of said drive-shaft, provided with a series of axially equally spaced pairs of relatively small diameter and narrow snap-type-non-rotatable, fluid-sealring means, with each pair provided in a suitable annular groove in periphery such drive-shaft; means providing, an inward flanged end, said stator-support with an accessible hydraulic fluid supply tubing connection means extending from manually operative remote source of supply of same, and provided terminating in access means within such stator-support, leading to axially outward end such larger diameter bore therein, and thence through helically extending fluid communication access grooves extending axially outward in smaller diameter surface means, such drive-shaft leading from larger diameter bore end of such stator-support to free communication within such coupler-housing, and through which access means to manually variably supply such hydraulic fluid thereinto such housing for pressure-variable-ratio-reversing of same; and whereby use of such internal access means the fluid supply tubing connection thereto may be temporarily plugged, either during flanged un-bolting and/or bolting of such coupler-housing assembly in place without removing any fluid from internally thereto inasmuch as the relatively small diameter fluid-seal-rings in the periphery of said drive-shaft are now provided located internally to such flanged stator-support means and prevent any fluid leakage there-past latter and said drive-shaft.

6. A fluid pressure-variable-ratio-reversible, rotatable combined fluid-transmission-coupler-housing assembly, as defined in claim 4, provided with additional means therein and therewith comprising; means providing an axially outward splined end, said elongated tubular flanged stator-support, with a reduced diameter axially extending external spline integral therewith, and over which a matching internally splined, stator-reversing-disc is provided a pressed fit axially inward thereover and closing and seating against a provided oval annular shaped snap-type spring-steel retainer ring means, provided seated radially inward within a semi-circular annular shaped shouldered groove means, provided within external surface such stator-support at axially inward end such spline thereof for limiting any possible axially inward displacement of such stator-disc over such stator-support during liquid fluid pressure-variable-ratio-reversing of the coupler-housing assembly.

7. A liquid fluid, pressure-variable-ratio-reversible, rotatable combined fluid-transmission-coupler-housing assembly, as defined in claim 4, provided with additional means provided therein and therewith, comprising; means providing the elongated annular flanged shaped cover rotatable with the coupler housing as a relatively close cylindrical bore means rotative fit over the larger diameter cylindrical surface, means of the stepped in-tandem diameter's external cylindrical surfaces of the tubular flanged stator-support-means; means providing last mentioned larger diameter cylindrical surface, such stator-support-means with a series of axially equally spaced pairs of relatively large diameter and narrow snap-type-rotatable fluid-seal-ring means, with each pair provided radially slidable in a suitable annular groove within such last mentioned cylindrical surface, and exerting radially outward pressure against the bore of, and rotatable with the flanged annular cover; means providing latter adjacent an axially inward end thereof, with a suitable relatively large diameter spur-gear means integral and rotatable therewith as the indirect driving gear means of a non-illustrated, remotely located, common speedometer for indicating and recording respectively the speed of rotation of such combined coupler-housing traction-wheel assembly in miles per hour of latter's travel and the miles travelled per hour thereby, accordingly to its r.p.m. indicated and recorded of such traction wheel's revolutions during any period of time; and means providing a relatively small diameter rotatable spur-gear means rotatively driven by such large spur-gear, and provided rotatable driving a speedometer driving cable means.

8. A liquid fluid, pressure-variable-ratio-reversible, rotatable combined fluid-transmission-coupler-housing assembly, as defined in claim 4, provided with additional means therein and therewith, comprising; means providing the elongated tubular flanged stator support means, upon which said fluid-transmission-coupler-housing assembly, the rotatable drive-shaft of latter, and also a rotatable planet-gear-carrier are all provided as coaxially-concentrically, jointly adjustably-axially, rotatively supported on three different diameter tapering roller bearings jointly semi-directly supported by such stator support; and means providing an axially outward splined end, such stator support means having an internally splined stator-reversing-disc, an axially inward pressed fit thereover and seated against an oval annular shaped snap-type spring-steel, retainer-ring means provided seated radially inward within a semi-circular annular shaped groove provided, in said stator support, adjacent axially inward end of said spline and adjacent axially inward end of such stator-disc, thereby definitely limiting any further displacement of latter in such direction over such spline during such fluid, pressure-variable-ratio-reversing of such coupler-housing assembly.

9. In a liquid fluid, pressure-variable-ratio-reversible, rotatable combined hydrodynamical-torque-convertor and in-tandem multiply compounded planetary-gearing-driven, automatically-operative, combined fluid-transmission-coupler-housing and traction-wheel-hub assembly of and for an automotive vehicle, means provided therein and therewith for improving the forward motion rotation starting torque efficiency of such coupler-housing assembly comprising; a series of elongated-cylindrical combined impulse-reaction fluid-flow-circulating tube means provided symmetrically disposed bearing radially outward against an inner periphery of such coupler-housing concentrically with its rotation-axis, with one each such tubes provided pressed through and extending a predetermined distance axially outward beyond a similar series of cylindrical access hole means, each provided extending axially through a radially inward extending annular shaped partition means integral with said coupler-housing and provided forming a shouldered -cylindrical-seat means for an annular shaped orbit-gear rotatable with axially inward end such housing, and with each such tube provided adjacent its axially opposite ends with one each of an axially opposite pair of obliquely semi-circumferentially and axially extending, respective fluid-flow-impulse and fluid-flow-reaction access means on the same side thereof circumferentially oppositely to a normal forward rotation direction of such coupler-housing with each fluid-flow-impulse access located adjacent a radially outward periphery end of an axially inward multiple convex-vaned fluid-circulating-discharge-impeller means, rotatable with a planet-gear-carrier of such transmission-coupler in same normal forward direction rotation as its housing, and with each fluid-flow-reaction access located adjacent a radially outward periphery end of an axially outward multiple concave-scoop-vaned fluid-circulating-induction-suction-impeller means, also rotatable with such carrier adjacent its axially outward end; and means providing a hub of each such rotatable in-tandem multiple compounded planetary-gearing means with a series of symmetrically spaced, diagonally axially extending, fluid-circulating-access means, with each of latter provided during rotation of its respective planet-gearing in its normal direction of rotation taking fluid circulation induction suction from the fluid circulating-induction-impeller means axially outward side thereof, and thence discharging such circulating fluid from its axially oppositely fluid circulating discharge impeller means side thereof into the adjacent axial side such discharge impeller for purpose of such improvement in said starting torque efficiency of such coupler-housing assembly.

10. In a liquid fluid, pressure-variable-ratio-reversible, rotatable combined hydrodynamical-torque-convertor and in-tandem multiply-compounded planetary-gearing-driven, automatically-operative, combined fluid-transmission-coupler-housing and traction-wheel-hub assembly, normally adapable as a pair, with one each provided forming an axially opposite rear traction-wheel assembly of and for a modern automotive vehicle, the provision of improvement means therein and therewith comprising; means providing an annular flanged shaped large roller-bearing cover means, secured indirectly to and rotative with such coupler-housing adjacent an axially inward end thereof over an external cylindrical surface of an elongated tubular flanged shaped stator support, provided supporting such coupler-housing assembly, and with said cover means provided with a relatively large diameter integral spur-gear means for rotatively indirectly driving a necessary conventional speedometer of the automotive vehicle, not illustrated, but for indicating and recording the rotation of such combined coupler-housing traction-wheel assembly; and means providing a relatively small diameter rotatable, spur-gear means rotatively driven by such large spur-gear means, and provided suitably journal-bearing supported extending axially inward through an axially inward flanged end, such elongated tubular flanged stator support means, and provided, adjacent axially inward end such journal-bearing with an enclosed speedometer drive cable of a normally axially opposite pair of same, recommended each connected to adjacent axial end of non-illustrated enclosed, minute differential gearing unit, through which to remotely rotatively drive such speedmeter of such vehicle.

References Cited by the Examiner
UNITED STATES PATENTS

| | | | |
|---|---|---|---|
| 2,764,040 | 9/1956 | Butler | 74—792 |
| 2,799,182 | 7/1957 | Butler | 74—677 |

DAVID J. WILLIAMOWSKY, *Primary Examiner.*
DON A. WHITE, *Examiner.*
L. H. GERIN, *Assistant Examiner.*